United States Patent
Enning et al.

(10) Patent No.: US 6,283,539 B1
(45) Date of Patent: Sep. 4, 2001

(54) CHANNEL WITH REINFORCING INSERT OF A MOTOR VEHICLE

(75) Inventors: Norbert Enning, Denkendorf; Andreas Ebert, Eching, both of (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 09/030,669

(22) Filed: Feb. 25, 1998

(30) Foreign Application Priority Data

Feb. 28, 1997 (DE) ................................................ 197 08 215

(51) Int. Cl.⁷ ..................................................... B62D 25/20
(52) U.S. Cl. ............................. 296/188; 296/209; 296/30
(58) Field of Search ................................ 296/209, 30, 188

(56) References Cited

U.S. PATENT DOCUMENTS

| | | | |
|---|---|---|---|
| 4,944,553 | * | 7/1990 | Medley et al. ....................... 296/188 |
| 5,246,264 | * | 9/1993 | Yoshii ............................... 296/188 X |
| 5,370,438 | * | 12/1994 | Mori et al. ......................... 296/209 X |
| 5,443,297 | * | 8/1995 | Tanaka et al. ...................... 296/30 X |
| 5,613,727 | * | 3/1997 | Yamazaki ............................ 296/188 |

FOREIGN PATENT DOCUMENTS

| | | | |
|---|---|---|---|
| 97473 | * | 4/1988 | (JP) ..................................... 296/209 |
| 18784 | * | 1/1989 | (JP) ..................................... 296/209 |
| 406166383 | * | 6/1994 | (JP) ..................................... 296/209 |

\* cited by examiner

*Primary Examiner*—Joseph D. Pape
(74) *Attorney, Agent, or Firm*—Lalos & Keegan

(57) ABSTRACT

A channel of a motor vehicle with a reinforcing insert. The channel serves as an essential load bearing structure of a motor vehicle. The channel is also served as a stable barrier to protect the passenger compartment in the event of a crash.

5 Claims, 1 Drawing Sheet

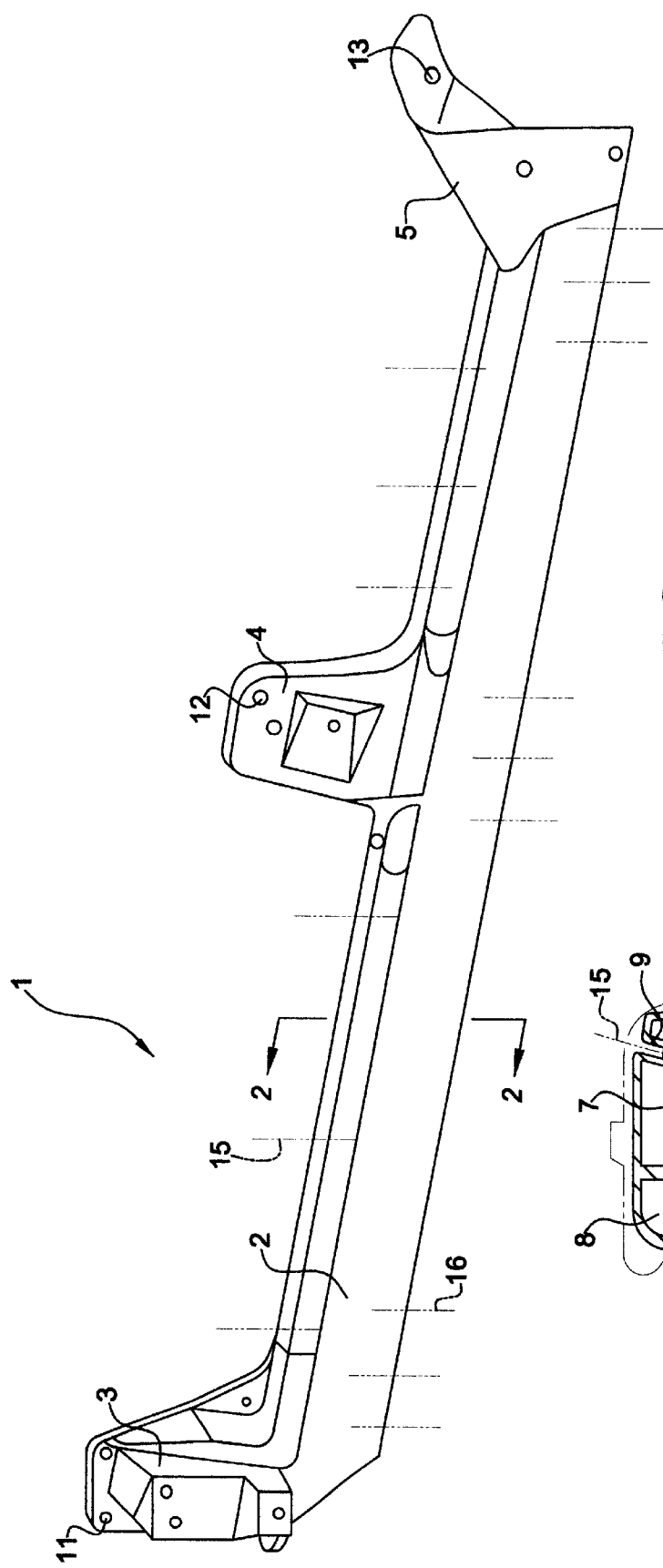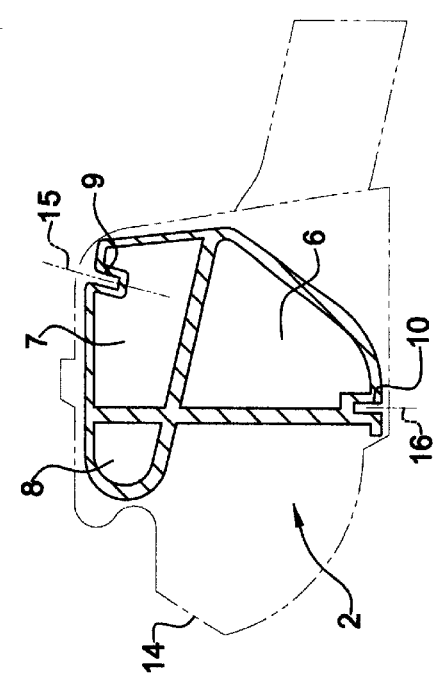

CHANNEL WITH REINFORCING INSERT OF A MOTOR VEHICLE

DESCRIPTION

The invention relates to a channel of a motor vehicle with a reinforcing insert consisting of a long extruded section element (2) of light alloy with joining element (3, 4, 5) connected, which insert may be inserted into the channel and may be connected to the joining element (3, 4, 5) along with adjacent body parts.

The channel of a motor vehicle is an essential load bearing and support element of the load bearing structure of a motor vehicle. In particular the function of the channel is to act as a stable barrier to collapse of the passenger compartment in the event of a side crash.

There is already a channel design in the state of the art with which these requirements may be met at a suitably low weight (Patent Abstracts of Japan, Publication No. 05270447 A); in a hybrid construction this design is represented by an extruded aluminum section and a steel tube. The extruded aluminum section forms the outer walls of the channel and includes, among other things a central longitudinal compartment into which the steel tube is force fitted as reinforcing insert. There are in addition continuous longitudinal side flanges molded onto the extruded aluminum section by way of which connection is made to the floor structure of the motor vehicle. Costly state-of-the-art aluminum welding processes or adhesion processes may be applied to make the connection. It is especially difficult to produce a stable and durable connection if the extruded aluminum section is to be connected to adjoining sheet steel body parts. In the event of repair replacement of a channel design such as this entails considerable expense, in that aluminum welding processes, for example, are generally not permissible in the same locations after channel replacement.

A generic channel of a motor vehicle with a reinforcing insert is also known (DE 195 28 874 A1; FIGS. 5 and 6). The reinforcing insert consists of a long extruded section of a light alloy which may be inserted into the shell. A fastening tab which may be connected to adjacent body parts is also provided as joining element.

The embodiment with a fastening tab is used for a design in which a reinforcing insert is provided exclusively between the area of the B post and a C post. In this case, connection of the reinforcing insert by way of a fastening tab at the foot of the B column is provided, the fastening tab being connected in the longitudinal direction of the section and functioning more or less to cover a cavity present in the structure. No fastening tabs are provided in one embodiment also presented in the reference, a design with a reinforcing insert extending over the entire length of the channel (FIG. 3).

There is also in the art a channel in a sheet steel structure (US 5 246 264) in which a reinforcing insert is welded into the hollow structure as a web plate for construction of a multicompartment channel.

In addition, the art comprises an impact resistance element in the form of an extruded light alloy section for insertion and bracing in a vehicle wall element, in particular a vehicle door (DE 43 06 824 A1).

In another known closure element of a motor vehicle longitudinal support element in the form of an extruded section element (DE 42 35 738 A1), fastening elements are molded on the support element and are cut out and machined to form connecting tabs.

The object of the present invention is to improve a generic channel of a motor vehicle with reinforcing insert with respect to its stability in conjunction with the adjoining body structure, and in particular to design this channel for use in a hybrid construction with a reinforcing insert entirely of a light alloy and adjoining body parts of sheet steel.

This object is attained by means whereby the reinforcing insert is a one-piece subassembly which extends over the entire length of the channel. There are provided on this reinforcing insert a front, a center, and a rear joining element that are spaced a certain distance above the extruded section element when the reinforcing insert is in its installed position. The front, center, and rear joining elements may then be connected by screw connections to a lower area of the A post, B post, and C post of a vehicle body. The joining elements are cast light alloy elements connected to the extruded section element by welding or adhesion.

Use of a long extruded section element of a light alloy as a reinforcing insert in a hollow channel carrier results on the whole in a lower weight structure, it being possible to design the hollow channel carrier conventionally as a sheet steel structure. The reinforcing insert is mechanically supported and connected by way of joining elements connected to the extruded section element, so that the energy of impact in a side crash is introduced directly into the load bearing structure and not indirectly by ways of the surrounding hollow channel carrier. Insertion of the light alloy extruded section element with joining elements connected into the surrounding hollow channel carrier makes it possible to apply a simple connecting technology combined with conventional sheet steel structures and at the same time to channel force into stable body support points.

The joining elements are for this purpose spaced when in the installed position a certain distance above the extruded section element. Each front, center, and rear joining element may be connected to a lower area of an A post, B post, and C post of a motor vehicle body and in this instance the joining elements may also serve as reinforcing elements.

The joining elements are cast light alloy parts simple to produce in the irregular shapes required, parts which may be connected with the extruded section to a component by state-of-the-art connection technologies such as welding or adhesion. Connection to adjacent body parts is effected by means of screw connections, preferably by dual use of screw connection points already present, as hinged screw connections and/or safety belt screw connection points mounted in the lower area of the body posts. This results in simple and quick end assembly of the reinforcing insert, along with a stable connection to the load bearing body structure suitable for high force inputs. Since this connection is effected without welding technologies, connection to the adjacent conventional sheet steel structures presents no problems. In addition, this results in especially great ease of repair, in that this reinforcing insert may be replaced simply by means of screw connections and costly aluminum welding in workshops is eliminated.

An extruded section with several compartments separated by webs is proposed to increase rigidity combined with reduction in weight.

Further proposes the opening of screw channels for self-tapping screws on the top or bottom extending through the long side. This makes it possible to connect and immobilize the reinforcing insert in the surrounding hollow channel carrier by simple means, it being possible to produce this hollow channel carrier and other adjoining body parts from sheet steel.

An exemplary embodiment of the invention is described in detail with reference to the drawing, in which FIG. 1 presents a perspective side view of a reinforcing insert for a channel for a motor vehicle, and FIG. 2 a cross-section of the reinforcing insert shown in FIG. 1, along line A—A.

A reinforcing insert 1 is illustrated in FIGS. 1 and 2 as a one-piece component consisting of a long extruded section element 2 of light alloy, preferably an aluminum alloy, with three joining elements 3, 4, 5 connected.

The extruded section element 2 contains three compartments 6, 7, 8. In addition, through screw channels 9, 10 are made in the top and bottom of the long side of the extruded section element 2.

The three joining elements 3, 4, 5 are spaced a certain distance above the structure when in the installed position as webs. Joining elements 3 and 5 are mounted to the end sides of the extruded section element 2 as front joining element 3 and rear joining element 5. A center joining element 4 is fastened approximately in the central area of the extruded section element 2.

The joining elements 3, 4, 5 are produced as light alloy castings. The connection between the extruded section element 2 and the joining elements 3, 4, 5 may be effected by welding or adhesion, the premounted component shown in FIG. 1 being obtained by preassembly. The joining elements 3, 4, 5 are designed so that each of them may be connected to a lower area of an A post, B post, and C post (not shown). Drilled holes 11, 12, 13 are provided for this purpose on each joining element 3, 4, 5, which holes are at least partly aligned with drilled holes and recesses necessarily present for door hinges and/or safety belt fastenings. Dual use is made of such fastening points necessarily present for door hinges and/or safety belt fastenings. Dual use is thus made of such fastening points necessarily already present when the screw connections are mounted.

As installed the reinforcing insert or extruded section element 2 has been inserted into a surrounding hollow channel carrier 14, as illustrated by broken lines in FIG. 2. The joining elements 3, 4, 5 are connected to the lower areas of the associated posts. In addition, the sheets of the hollow channel carrier 14 and/or other added elements are connected by self-tapping screws 15, 16 (represented schematically by broken lines) to the extruded section element 2 by way of screw channels 9, 10.

Hence simple means are employed and little weight is added in creating effective reinforcement against the event of a side crash in the channel, in particular that of a steel body.

What is claimed is:

1. A reinforcing insert assembly for a channel of a motor vehicle, said reinforcing insert comprising a long extruded section element made of a light alloy with a front joining element, a center joining element and a rear joining element, which reinforcing insert may be inserted into the channel and the joining elements may be connected to a plurality of adjacent body parts of the motor vehicle;

wherein the reinforcing insert is a component extending over an entire length of the channel;

the reinforcing insert joining elements once installed, are positioned above the long extruded section element;

the front, the center, and the rear joining elements may be respectively connected to an A post, B-post, and a c post of the motor vehicle body by screw connections; and the front, center, and rear joining elements are made of light alloy castings and are connected to the long extruded section element by one of welding and adhesion.

2. The assembly as claimed in claim 1, wherein the front, center and rear joining elements are connected to the motor vehicle body by screw connections through dual use of screw connection points including one of hinged screw connection points and safety belt screw connection points.

3. The assembly as claimed in claim 1, wherein the long extruded section element contains a plurality of compartments.

4. The assembly as claimed in claim 1, wherein the long extruded section element is attachable to a plurality of screw channels by a plurality of self-tapping screws.

5. The assembly as claimed in claim 1, wherein the plurality of adjacent body parts are sheet steel parts.

* * * * *